June 22, 1954 W. H. SERGENT 2,681,624
CANDYMAKING MACHINE
Filed Aug. 31, 1950 5 Sheets-Sheet 3

Inventor
Walter H. Sergent
by [signature] Attys

June 22, 1954  W. H. SERGENT  2,681,624
CANDYMAKING MACHINE

Filed Aug. 31, 1950  5 Sheets-Sheet 5

Inventor
Walter H. Sergent
by Hill, Sherman, Meroni, Gross & Simpson Attys

Patented June 22, 1954

2,681,624

UNITED STATES PATENT OFFICE 2,681,624

CANDYMAKING MACHINE

Walter H. Sergent, Middletown, N. Y., assignor to Ideal Wrapping Machine Company, Middletown, N. Y., a corporation of New York Application August 31, 1950, Serial No. 182,546

3 Claims. (Cl. 107—8)

This invention relates generally to candy making methods and apparatus and more particularly to an improved mechanism whereby sucker or lollipop-type candy may be provided with a preformed recess whereupon a stick, or other handle support means having a blunt end may be inserted into the recess.

Although candy making machines capable of producing sucker or lollipop-types of candy are old in the art, such machines have usually included stick inserting mechanisms whereby a sharply pointed stick, or other handle-forming means is bodily plunged into a preformed piece of candy. A typical mechanism for accomplishing this end is shown in my Patent No. 2,014,593, issued September 17, 1935.

According to the general principles of the present invention, a candy piercing mechanism for a candy wrapping machine is established at a station location prior to the stick inserting mechanism, the candy piercing mechanism including a reciprocating plunger slide having a piercing pin adapted to form a recess of predetermined size in the piece of candy so that a blunt ended stick, or handle-forming means may be inserted by the stick inserting mechanism into the recess.

The advantages of such an arrangement are numerous since simple blunt ended sticks may be employed which need not be subjected to costly end sharpening procedures and the prior formation of the stick receiving recess also cuts down on the breakage of sticks during the insertion process.

It will also be evident that the use of blunt ended sticks affords the provision of a highly advantageous safety feature, since after the candy impaled upon the stick is eaten, there is less likelihood that children, particularly, will be subject to injury in connection with the sharp point formed on the end of the stick or handle-forming means.

It is an object of the present invention, therefore, to provide a method of preparing candy whereby a blunt ended stick may be inserted in a preformed recess pierced in a molded piece of candy.

Another object of this invention is to provide a method of preparing candy whereby a wrapped piece of molded candy may be pierced and a blunt ended stick may be thereafter inserted through the wrapping and into the recess formed in the candy.

A further object of this invention is to provide an improved candy handling apparatus whereby pieces of molded candy might be pierced prior to the insertion of a blunt ended stick, or handle-forming means.

A further object of the present invention is to provide an improved candy handling machine whereby molded pieces of candy may be wrapped and thereafter subjected to a piercing operation prior to the insertion of a blunt ended stick actuated by a stick inserting mechanism.

Another object of the present invention is to provide a candy piercing attachment for a candy handling machine.

Many other features, advantages and additional objects of the present invention will become manifest from the detailed description which follows and the accompanying sheets of drawings in which a preferred form of a candy handling machine constructed in accordance with the principles of the present invention is shown, the preferred structural embodiment being exemplary of the types of mechanism with which the steps of the method of my invention may be practiced.

Figure 1:
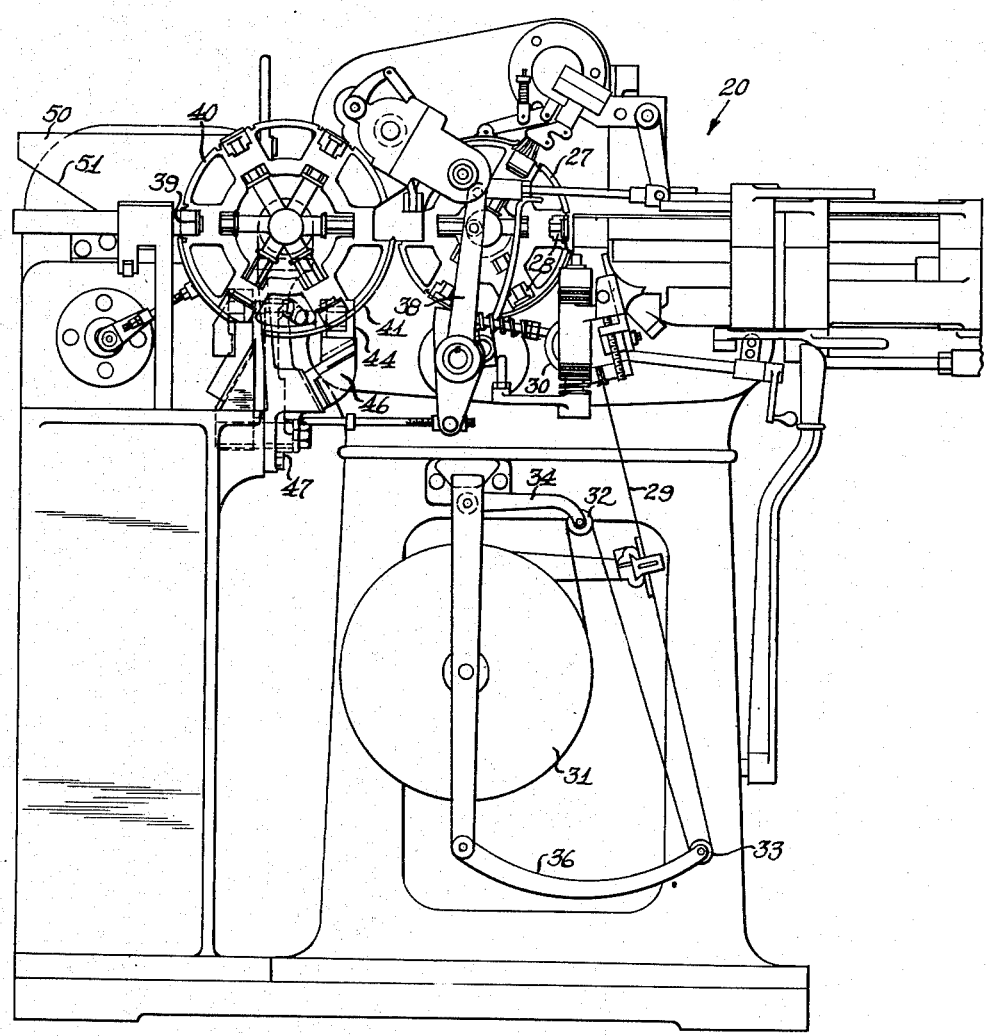
Figure 1 is a side elevational view of a machine for wrapping, piercing and inserting sticks in candy constructed in accordance with the principles of the present invention.
Figure 2:
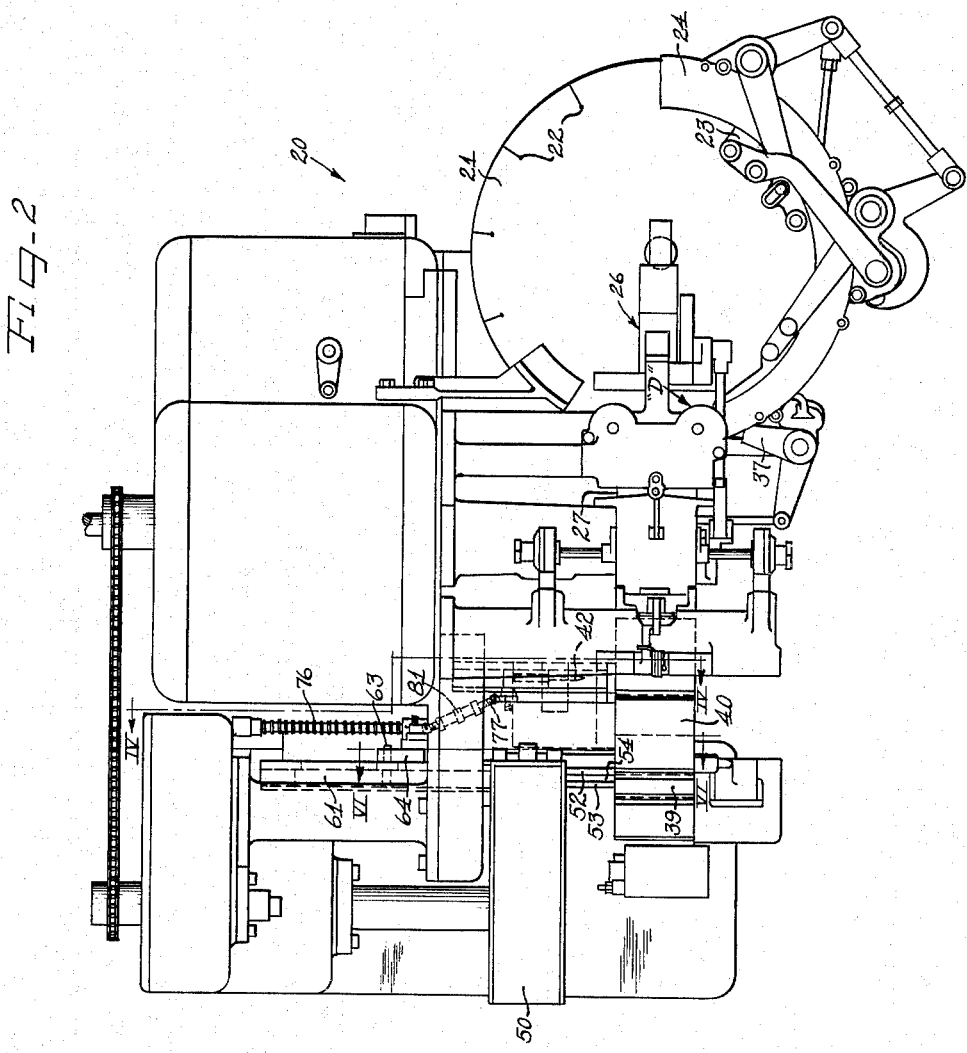
Figure 2 is a top plan view of the machine shown in Figure 1.
Figure 3:
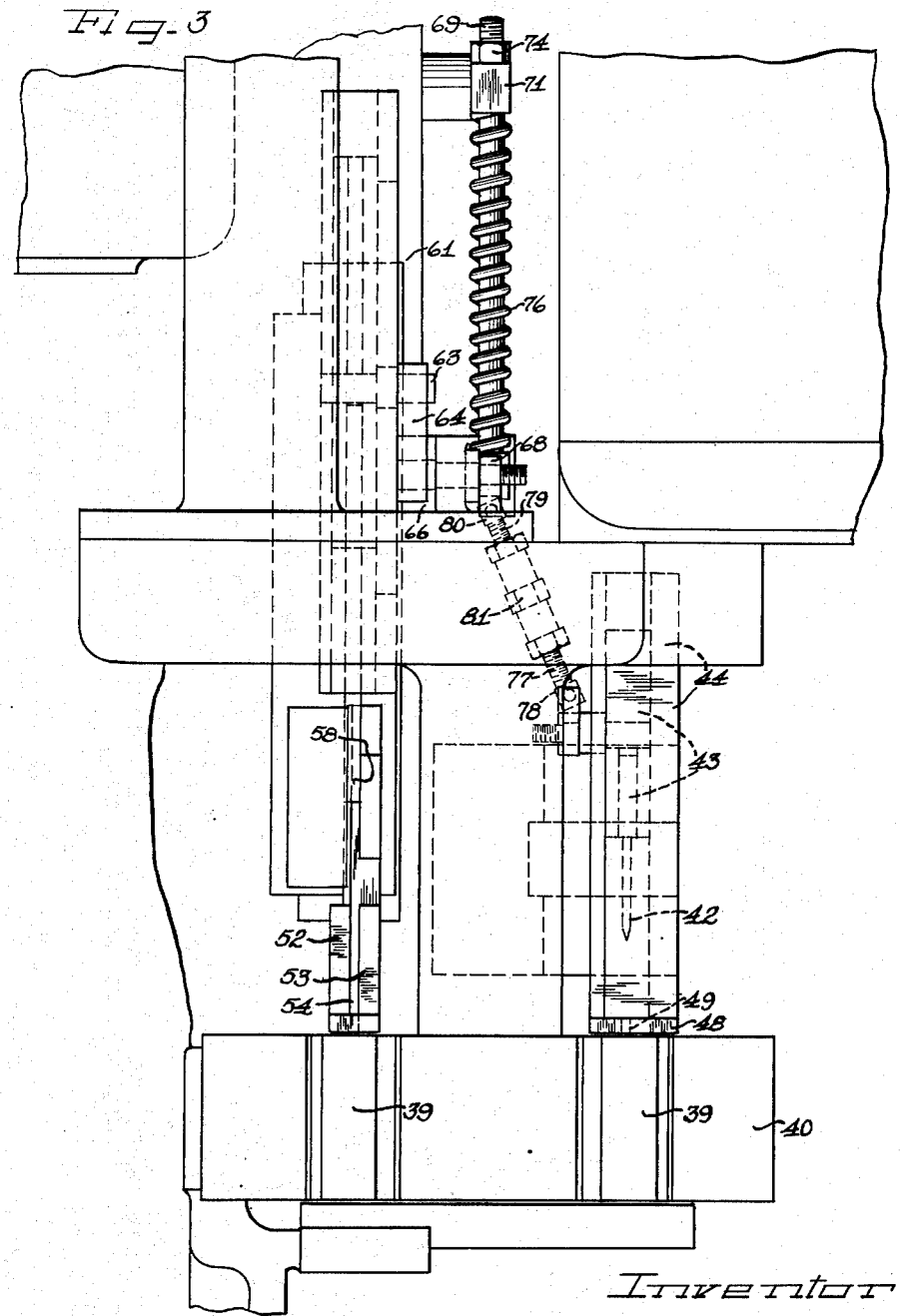
Figure 3 is an enlarged fragmentaary plan view of a portion of the machine shown in Figure 2 and particularly illustrating the structural features of the candy piercing mechanism provided in accordance with the present invention.

The machine shown in Figures 1 and 2 is in many respects quite similar to that disclosed in my Patent No. 2,014,593 issued September 17, 1935 and accordingly, a detailed description of all of the operational and structural features thereof is believed to be unnecessary since reference may be made to the acknowledged patent disclosure for further clarification.

For purposes of orientation, however, the machine and its mode of operation will be briefly desired.

A caramel wrapping machine is indicated generally by the reference numeral 20 and includes a revolvable cover head 21 having knives 22 between which parts of a batch of candy dough placed upon the cutter head 21 may be forced or kneaded by a plurality of shoes or kneaders 23 when the knives 22 have rotated into the sphere of action of the kneaders 23, which sphere of action is under a suitable guard 24 extending over an arcuate portion of the wheel.

The kneading and cutting mechanism is actuated in a well known manner and after the kneaders 23 have properly formed a caramel, or a piece of candy, between a pair of knives 22 under the guard 24, it is severed from the remainder of the batch by the coaction of one of the kneaders 23 and the knives 22 whereupon the sheared and formed caramel is rotated to a discharging station D (Fig. 2) where it is ejected by an ejector mechanism indicated generally by the reference numeral 26.

A wrapping wheel 27 having a plurality of radially spaced pockets 28 is rotatably mounted in alignment with the ejector mechanism 26 so that each of the pockets 28 may be placed in selective registry therewith for receiving one of the caramels projected by the ejector mechanism 26. Before a carmel, or piece of candy is projected into a pocket 28, however, a paper 29 for use as a wrapper is fed upwardly by a feed roll 30 from a reel 31, the paper passing over the rolls 32 and 33, respectively, on tension arms 34 and 36. A movable blade 37 is provided which, together with a fixed blade (not shown) is mounted and operated to shear the wrapper strip before a caramel, or piece of candy is ejected into one of the pockets 28, the paper 29 being fed across the pockets so as to be carried thereinto by the injected piece of candy.

It will be understood that the wrapping wheel 27 is intermittently driven by Geneva gearing, or some other suitable means, in a well known manner and suitable mechanism is provided in conjunction with the wrapping wheel 27 to form folds in the severed piece of paper 29 so that the caramel, or piece of candy carried in one of the pockets 28 will be substantially wrapped after the wheel 27 has been angularly shifted through a predetermined displacement.

When a caramel or piece of candy is projected into a pocket 28 in the wrapping wheel 27, a lever 38 is operated for ejecting a caramel or piece of candy from the diametrically opposed pocket 28 in the wrapping wheel 27 through the instrumentality of an ejecting arm carried by the lever 38, thereby moving the substantially wrapped caramel or piece of candy, into one of a plurality of pockets 39 formed in a second wrapping wheel 40. The wheel 40 is arranged to rotate in an opposite direction from the wheel 27 and the substantially wrapped caramel or piece of candy is positioned in one of the pockets 39 in reverse condition so that the tips of the folded end portions of the wrapper paper may be folded in against the caramel, or piece of candy. To accomplish that end, an ironer 41 is provided adjacent the wrapping wheel 40.

After the tips of the end folds of the wrapper have been folded against the caramel, or piece of candy, insertion of a stick may be effected.

In accordance with the principles of the present invention, however, at least a pair of separate stations are sequentially arranged around the wrapping wheel 40 to lie in selective registry with the pockets 39 as the rotary wheel 40 is periodically shifted.

The first of the sequentially arranged stations comprises a candy piercing mechanism best indicated in Figures 3 through 6.

A piercing pin 42 is fastened in a plunger 43 which, in turn, reciprocates in a plunger slide 44 fastened on a bracket 46 carried by a bearing bracket 47 (Fig. 1).

On one end of the plunger slide 44 and interposed between the plunger slide 44 and the wrapping wheel 40 is situated a plate 48 having formed therein a centrally disposed aperture 49 to receive the piercing pin 42 when it is reciprocated forwardly in the direction of the wrapping wheel 40. The plate 48 operates, not only to guide and support the piercing pin 42 in the course of its reciprocatory movement, but in addition, to protect the piercing pin 42 from fallen or misplaced candy when the wrapping wheel 40 is turning, or being shifted angularly. The plate 48 further acts as a stripper plate should the piercing pin 42 tend to carry along the piece of candy contained in the pocket 39 in registry with the candy piercing mechanism.

The second station comprises a stick inserting mechanism, the details of construction of which are fully described and claimed in my acknowledged Patent No. 2,014,593. The stick inserting mechanism includes a hopper 50 having a sloping bottom 51 in which a plurality of sticks may be placed. Agitator means are provided and the sticks will descend one at a time into a narrow guideway 54, one side of the guideway being formed by a retaining member 52 and the other wall being formed by a slat 53 so that the guideway takes the form of a groove 54 formed therebetween. An end member 56 is situated on the end of the retaining member 52 and the slat 53 and has an aperture 57 in registry with the groove 54. The end member 56 lies directly adjacent the wrapping wheel 40 and is arranged to guide and support the blunt ended stick into the recess of the caramel, or piece of candy, carried in one of the pockets 39 formed in the wrapping wheel 40.

A plunger rod 58 is situated in alignment with the groove 54 and is adapted to be actuated for engaging the end of a stick and pushing the same into the recess formed in the caramel, or piece of candy. The plunger rod is secured in a reciprocating member 59 mounted in a guideway 60 formed in a guideway structure 61.

A slot 62 is provided in the guideway structure 61 and provides a camming surface for a pin 63 secured in the reciprocating member 59. A link 64 is pivoted at one end to the pin 63 and is pivoted at its other end to a lever 66 fulcrumed upon a pivot stud 67.

Figure 4:
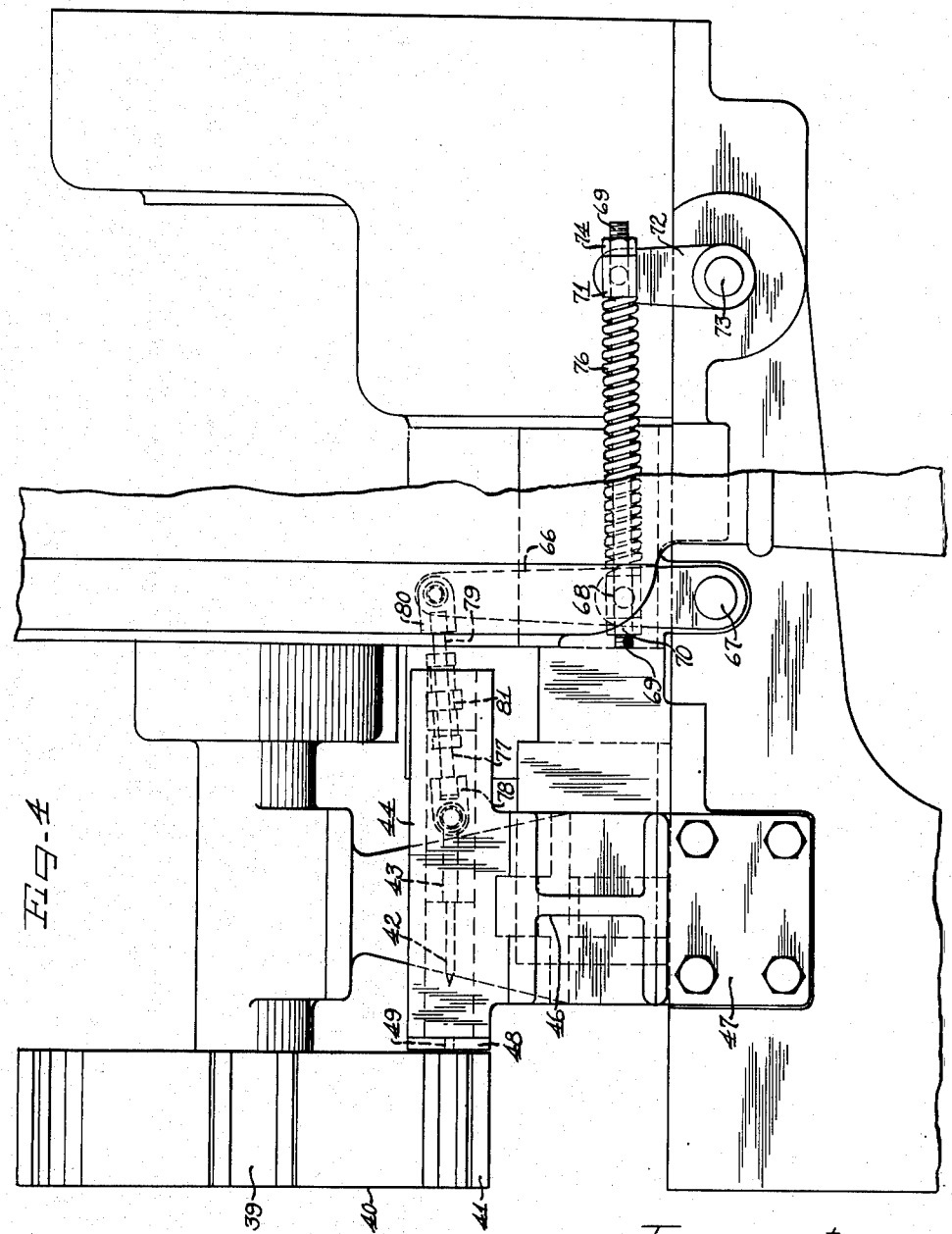
Figure 4 is an enlarged fragmentary cross-sectional view with parts shown in elevation and with parts broken away for the sake of clarity taken substantially on line IV—IV of Figure 2.
Figure 5:
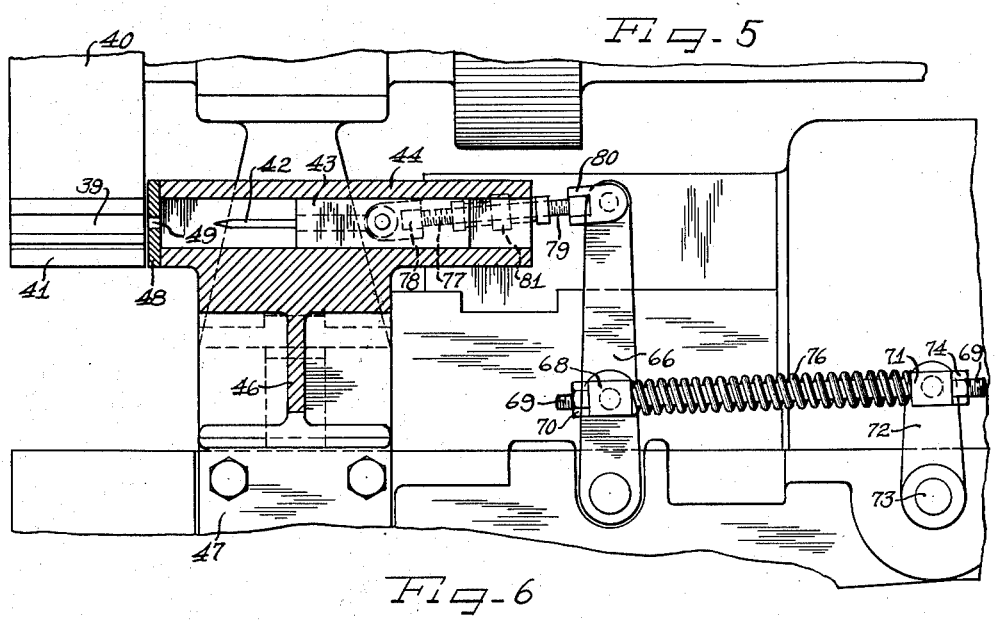
Figure 5 is a view similar to Figure 4, but with parts broken away and with additional parts shown in cross-section illustrating additional structural details of the candy piercing mechanism.
Figure 6:
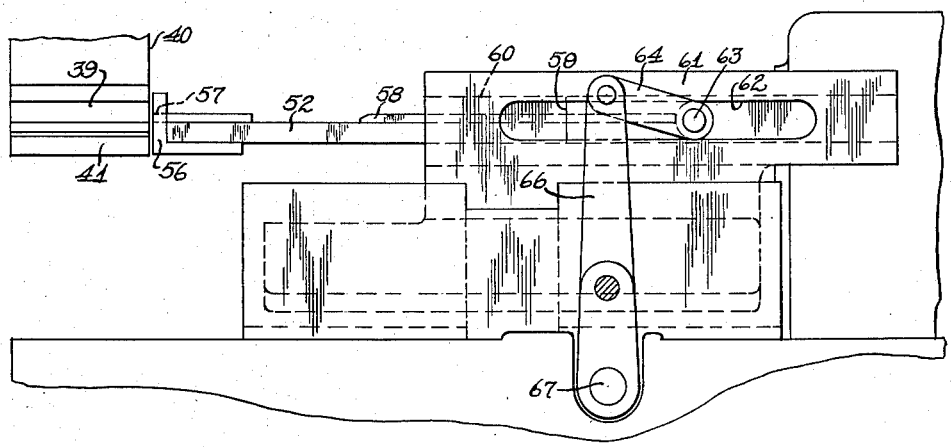
Figure 6 is an enlarged fragmentary cross-sectional view with parts shown in elevation taken substantially on line VI—VI of Figure 2.

As may be seen more clearly in Figures 4 and 5, the lever 66 is provided with a bearing lug 68 through which a rod 69 extends and to which it is slidably anchored by means of a nut 70. The rod 69 is slidably anchored at one end to the lever 66 while its other end extends through a bearing lug 71 upon a crank arm 72 secured upon a shaft 73. The rod 69 is slidably secured in the lug 71 by a nut 74.

A coil spring 76 surrounds the rod 69 between the bearing lugs 68 and 71 so that movement of the crank arm 72 toward the lever 66 will be transmitted through the spring 76, thereby actuating the lever 66 and the stick inserting mechanism.

It may be noted that the shaft 73 is rotated by a camming mechanism so as to periodically actuate the various elements of the train of mechanism provided to actuate the stick inserting apparatus. The details of structure and operation of such an arrangement are particularly described in the acknowledged Patent No. 2,014,593.

In order that the candy piercing mechanism may be operated simultaneously with the stick inserting mechanism and through the same train of mechanism, a universal connecting link is provided which includes a first threaded stem 77 having a bearing block 78 pivotally connected with the plunger 43 and a second threaded stem 79 having a bearing block 80 on the end thereof and being pivotally connected to the lever 66. The first stem 77 and second stem 79 are interconnected by an adjustable threaded sleeve 81. Thus, every time the lever 66 is actuated through the spring 76 by the movement of the crank arm 72, the plunger 43 will operate the piercing pin 42 to form a recess in a caramel, or piece of candy, positioned in one of the pockets 39 of the wrapping wheel 40. Simultaneously, a blunt ended stick will be inserted into the next adjacent recessed caramel.

After a blunt ended stick has been inserted in the recess of a caramel, or piece of candy, pierced by the pin 42 of the candy piercing attachment, the wrapping wheel 40 will advance to shift the angular relationship of the pocket 39 so that the pocket containing the caramel with the applied stick will be advanced to the ejecting point which is in the same horizontal plane as the loading, or receiving point. When a pocket reaches the ejecting point, an ejector mechanism will operate to eject the caramel with the stick in a well known manner.

In the operation of the machine, a number of caramels, or pieces of candy will be continuously passing through the machine with the wrapper thereon in different stages of the folding operation, and whenever a completed caramel, or piece of candy is ejected from the wheel 40, another piece of candy is injected into such wheel and at the same time another piece of candy is injected into the wrapping wheel 27 from the cutter disc 21. There is, therefore, a continuous stream of caramels, or pieces of candy fed from the cutter disc 21 to the wrapping, piercing and stick applying mechanism.

The various steps involved in the complete method of preparing a piece of candy in accordance with the principles of the present invention is best appreciated by tracing the progress of a typical caramel through the various stages encountered in the preferred form of structural apparatus provided and described above.

The caramel is first formed and cut to proper size on the cutter disc 21 from which it is ejected by the ejector apparatus 26 into one of the pockets 28 formed in the wrapping wheel 27 carrying the wrapper 29 which has been previously sheared from the paper web.

As the wrapping wheel 27 advances step by step, the wrapping severed from the web 29 is progressively folded and ironed so that the caramel will be substantially wrapped just prior to its ejection by the lever 38 from the wrapping wheel 27 into one of the pockets 39 of the wrapping wheel 40.

As the wrapping wheel 40 advances a step, the end folds of the wrapping are pressed against the caramel by the folder 41 which operates to iron the wrapper. As the wheel 40 makes a pause, another caramel is fed into the next pocket 39 and the plunger 43 reciprocating in the plunger slide 44 actuates the piercing pin 42 through the aperture 49 of the plate 48 through the wrapping and into the end of the caramel. The piercing pin 42 enters the caramel and preforms a recess in the end of the caramel of predetermined configuration and size.

The next shift of the wrapping wheel 40 then advances the caramel to the stick inserting station where the plunger 58 will drive a blunt ended stick through the aperture 57 and into the preformed recess shaped by the piercing pin 42. It will be understood that the stick drops by gravity upon the guideway 54 so that a stick is always in position for engagement by the plunger.

After a stick has been inserted in the caramel, the caramel will be ejected from the machine.

From the foregoing it will be apparent that a constant stream of caramels is continuously passing through the machine with suitable pauses to perform the necessary operations. It will also be appreciated that the caramel is rigidly confined in the pockets of the wrapping wheel so that the pieces of candy will not be subjected to distortion during the operation of the machine.

Although I have resorted to details in the description of the structural features described in connection with the preferred embodiment illustrating the principles of my invention, it should be understood that I wish to incorporate within the scope of this patent all such modifications as reasonably and properly come within the scope of my contribution to the art.

I claim as my invention:

1. In a candy making machine, a first wrapping wheel having a plurality of circumferentially spaced pockets, means projecting a piece of unwrapped candy into each of said pockets on one side of said wheel, a lever having an ejecting arm for ejecting a piece of candy from the diametrically opposed side of said wheel, said ejected piece of candy having been substantially wrapped in said first wrapper wheel but having projecting tips of wrapper end folds, a second wrapping wheel adjacent said first wheel having a plurality of pockets with each one of said pockets receiving a substantially wrapped piece of candy from said first wheel, ironing means adjacent said second wheel to successively fold the tips of the wrapper end folds against a piece of candy thereby to completely wrap each respective piece of candy, and two sequentially arranged angularly spaced stations adjacent said second wheel, the first station comprising a candy piercing mechanism having a piercing pin and means to periodically reciprocate said pin into one of said pockets of said second wheel to pierce a wrapped piece of candy, and the second station comprising a stick inserting mechanism having a stick feeding hopper and a reciprocable plunger rod to engage the end of a blunt ended rigid stick and push the stick into the recess formed in the wrapped candy, and synchronized driving means for intermittently driving said wheels and said ejecting arm and for actuating said pin and said plunger.

2. In a candy making machine, a first wrapping wheel having a plurality of circumferentially spaced pockets, means projecting a piece of unwrapped candy into each of said pockets on one side of said wheel, a lever having an ejecting arm for ejecting a piece of candy from the diametrically opposed side of said wheel, said ejected piece of candy having been substantially wrapped in said first wrapper wheel but having projecting tips of wrapper end folds, a second wrapping wheel adjacent said first wheel having a plurality of pockets with each one of said pockets receiving a substantially wrapped piece of candy from said first wheel, ironing means adjacent said second wheel to successively fold the tips of the wrapper end folds against a piece of candy thereby to completely wrap each respective piece of candy, and two sequentially arranged angularly spaced stations adjacent said second wheel, the first station comprising a candy piercing mechanism having a piercing pin and means to periodically reciprocate said pin into one of said pockets of said second wheel to pierce a wrapped piece of candy, and the second station comprising a stick inserting mechanism having a stick feeding hopper and a reciprocable plunger rod to engage the end of blunt ended rigid stick and push the stick into the recess formed in the wrapped candy, and means interconnecting said mechanisms for simultaneous movement to form a recess in one piece of candy and to simultaneously insert a stick into the next adjacent recessed piece of candy.

3. In a candy making machine, a first wrapping wheel having a plurality of circumferentially spaced pockets, means projecting a piece of unwrapped candy into each of said pockets on one side of said wheel, a lever having an ejecting arm for ejecting a piece of candy from the diametrically opposed side of said wheel, said ejected piece of candy having been substantially wrapped in said first wrapper wheel but having projecting tips of wrapper end folds, a second wrapping wheel adjacent said first wheel having a plurality of pockets with each one of said pockets receiving a substantially wrapped piece of candy from said first wheel, ironing means adjacent said second wheel to successively fold the tips of the wrapper end folds against a piece of candy thereby to completely wrap each respective piece of candy, and two sequentially arranged angularly spaced stations adjacent said second wheel, the first station comprising a candy piercing mechanism including, a plunger slide, a plunger reciprocable therein having a piercing pin on the end thereof, a plate on one end of said slide having a centrally disposed aperture receiving the piercing pin when it is reciprocated in one direction to guide and support said piercing pin, and to strip candy from said piercing pin when it is reciprocated in an opposite direction, said pin being periodically reciprocated into one of said pockets of said second wheel to pierce a wrapped piece of candy, and the second station comprising a stick inserting mechanism having a stick feeding hopper and a reciprocable plunger rod to engage the end of a blunt ended rigid stick and push the stick into the recess formed in the wrapped candy, and synchronized driving means for intermittently driving said wheels and said ejecting arm and for actuating said pin and said plunger, said piercing pin mechanism and said stick inserting mechanism being interconnected for simultaneous movement to form a recess in one piece of candy and to simultaneously insert a stick in the next adjacent recessed piece of candy.

References Cited in the file of this patent

UNITED STATES PATENTS

| Number | Name | Date |
|---|---|---|
| Re. 22,376 | Davis | Sept. 14, 1943 |
| 1,452,604 | Hopkins | Apr. 24, 1923 |
| 1,689,879 | Krout | Oct. 30, 1928 |
| 1,692,559 | Miller | Nov. 20, 1928 |
| 1,694,458 | Trauger | Dec. 11, 1928 |
| 1,735,621 | Sergent | Nov. 12, 1929 |
| 1,922,563 | West | Aug. 15, 1933 |
| 2,005,854 | Davis et al. | June 25, 1935 |
| 2,128,992 | Elwell | Sept. 6, 1938 |
| 2,166,568 | Kuhlke | July 18, 1939 |
| 2,304,494 | Cahoon | Dec. 8, 1942 |